United States Patent [19]
Lyu

[11] Patent Number: 5,585,928
[45] Date of Patent: Dec. 17, 1996

[54] VIDEO SIGNAL RECORDING AND REPRODUCING APPARATUS A FREQUENCY DOWN-CINVERTED LUMINANCE SIGNAL INTO THE VERTICAL RETRACE LINE INTERVAL OF A RECORDING SIGNAL

[75] Inventor: Jae-Cheon Lyu, Seoul, Rep. of Korea

[73] Assignee: Samsung Electronics Co., Ltd., Kyungki-do, Rep. of Korea

[21] Appl. No.: 39,759

[22] Filed: Mar. 30, 1993

[30] Foreign Application Priority Data

Mar. 30, 1992 [KR] Rep. of Korea .................. 92-5290

[51] Int. Cl.$^6$ .................. H04N 5/76; H04N 7/12; G11B 5/00
[52] U.S. Cl. .................. 386/33; 348/427; 360/32
[58] Field of Search .................. 358/310, 335, 358/342, 330, 105, 136; 360/32, 33.1, 11; 348/427

[56] References Cited

U.S. PATENT DOCUMENTS

| | | | |
|---|---|---|---|
| 4,758,899 | 7/1988 | Tsukiyama ................. | 360/8 |
| 5,031,030 | 7/1991 | Hurst, Jr. . | |
| 5,038,219 | 8/1991 | Yamashita et al. .......... | 358/310 |
| 5,063,457 | 11/1991 | Ishikawa et al. ............ | 358/330 |
| 5,097,348 | 3/1992 | Suetaka ..................... | 358/335 |
| 5,113,262 | 5/1992 | Strolle et al. .............. | 358/310 |
| 5,191,434 | 3/1993 | Kim .......................... | 358/335 |
| 5,227,880 | 7/1993 | Kim .......................... | 358/335 |
| 5,371,602 | 12/1994 | Tsuboi et al. ............... | 358/335 |

*Primary Examiner*—Thai Q. Tran
*Assistant Examiner*—Robert Chevalier
*Attorney, Agent, or Firm*—Sughrue, Mion, Zinn, Macpeak & Seas

[57] ABSTRACT

A video signal recording apparatus includes a high band signal recording process unit wherein a high band signal separated from a video signal is transmitted to a low band to thereby be compressed and be outputted to a vertical retrace line interval by control of a control units, a recording unit for recording on a recording medium the high band signal and a video signal processed for the high band signal recording process unit, and a video signal reproducing apparatus includes a reproducing unit for reproducing a video signal recorded on the recording medium and high band signal reproducing process unit wherein, among the signals reproduced in the reproducing unit, a high band signal reproduced and compressed in a vertical retrace line interval is restored to thereby be transmitted to a high band and outputted.

18 Claims, 3 Drawing Sheets

VIDEO SIGNAL RECORDING AND REPRODUCING APPARATUS A FREQUENCY DOWN-CINVERTED LUMINANCE SIGNAL INTO THE VERTICAL RETRACE LINE INTERVAL OF A RECORDING SIGNAL

FIELD OF THE INVENTION

The present invention relates to an apparatus which can record and reproduce a video signal, and more particularly to a video signal recording and reproducing apparatus which can improve resolution by enabling a recording and reproducing of a high frequency band signal. The present disclosure is based upon the disclosure in Korean Patent Application No. 92-5290 filed Mar. 30, 1992, which disclosure is incorporated herein by reference.

BACKGROUND OF THE INVENTION

As an example of a conventional video signal recording and reproducing apparatus, a camcorder is integrated with a video cassette recorder and a video camera.

However, this kind of video signal recording and reproducing apparatus has a drawback in that it can not record and reproduce a high frequency band signal due to a physical characteristic of a recording medium and video head (or magnetic head).

In other words, because the quality of the material of the recording medium used for the conventional video cassette recorder is not good enough to record and reproduce a signal in a high frequency band and a gap of video head is not narrow enough to record and reproduce a high frequency band, a self induction enabling to record and reproduce the high frequency band signal is not realized.

In order to overcome the drawback, a technique has been developed to record and reproduce the high frequency band signal, wherein, in a video signal recording and reproducing apparatus for processing a video signal band of approximately 5 MHZ, setting 2.5 MHZ as a reference frequency, a frequency band of between 0–2.5 MHZ is set up as a low frequency band, and a frequency band of between 2.5 MHZ–5 MHZ is set up as a high frequency band, so that the low frequency band signal can be folded over the high frequency band signal for recording, and the low frequency can be unfolded over the high frequency band signal for band signal reproducing.

However, there arises a problem in that a severe crosstalk occurs in an area where the signals are folded due to an overlap between the low frequency band and high frequency band.

SUMMARY OF THE INVENTION

Accordingly, it is an object of the present invention to provide a video signal recording and reproducing apparatus which can improve resolution by compressing a high band component of a signal and recording the same on a vertical retrace line interval for reproducing.

In accordance with one aspect of the present invention, there is provided a video signal recording apparatus, the apparatus comprising a high band signal recording process means wherein a high band signal separated from a video signal is transmitted to a low band to thereby be compressed and be outputted to a vertical retrace line interval by control of a control means, and a recording means for recording on a recording medium the high band signal and video signal processed from the high band signal recording process means.

In accordance with another aspect of the present invention, there is provided a video signal reproducing means comprising a reproducing means for reproducing the video signal recorded on the recording medium, and a high band reproducing process means wherein the high band signal compressed and reproduced on the vertical retrace line interval is restored from the signal reproduced at the reproducing means to thereafter transmit the same to the high band for outputting.

BRIEF DESCRIPTION OF THE DRAWINGS

For fuller understanding of the nature and objects of the invention, reference should be made to the following detailed description taken in conjunction with the accompanying drawings in which.

BRIEF DESCRIPTION OF THE PREFERRED EMBODIMENTS

A detailed description will be made hereunder with reference to accompanying drawings according to the present invention.

Figure 1:
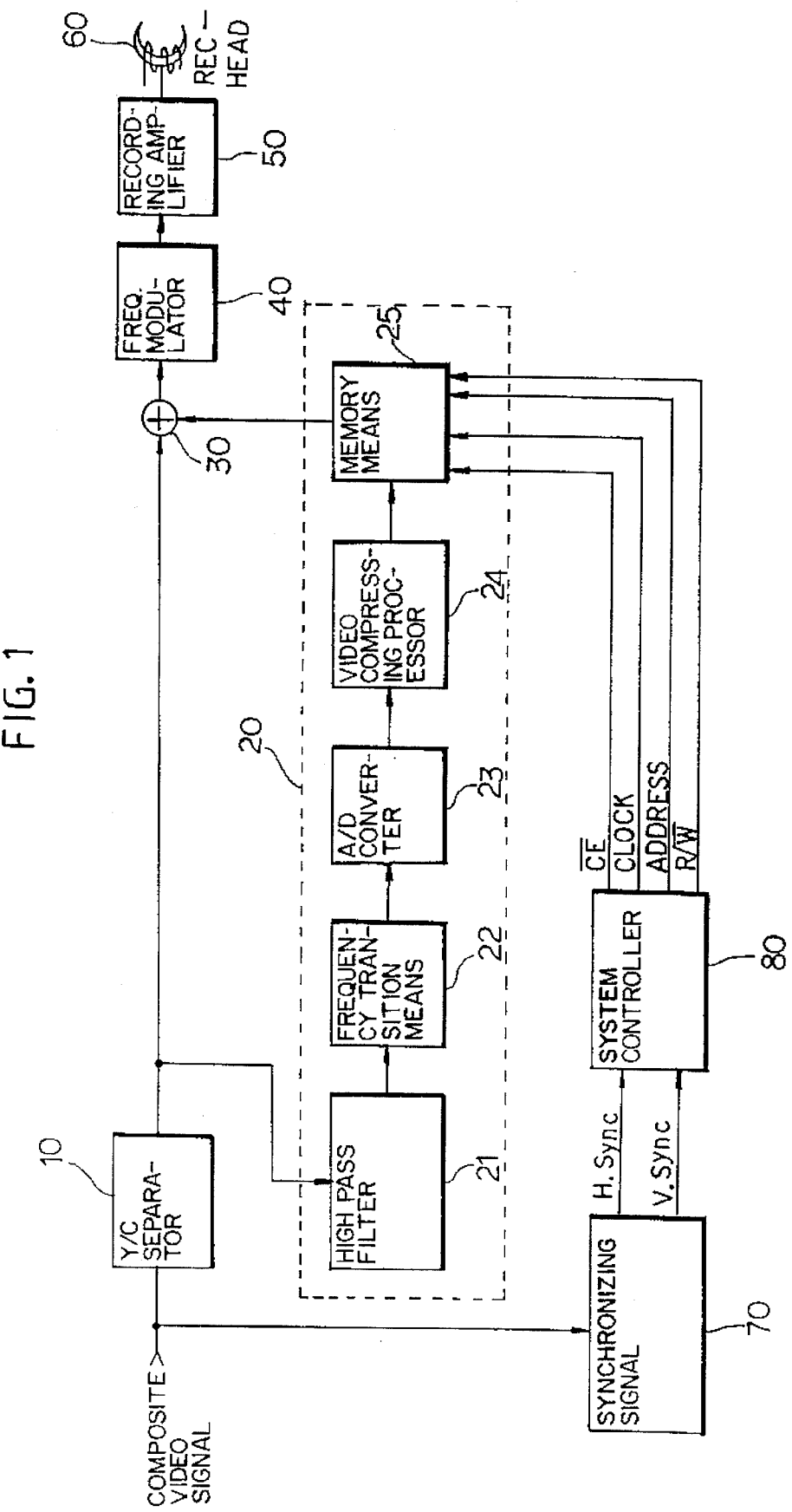
FIG. 1 is a block diagram of a video signal recording apparatus in accordance with an embodiment the present invention.

FIG. 1 is a block diagram of a video signal recording apparatus, the apparatus comprising a high band signal recording process means wherein a high band luminance signal separated from the video signal is transmitted to a low band to thereby compress the same, so that it can be outputted to a vertical retrace line interval by control of the control means, and a recording means for recording on a recording medium the luminance signal separated from the video signal and the high band luminance signal processed from the high band signal recording process means.

In the apparatus thus constructed, the high band signal recording process means 20 comprises a high pass filter 21 for passing only the high frequency band signal among the luminance signals separated from a luminance/chrominance signal separator 10, a frequency transition means 22 for transmitting a frequency of a signal outputted from the high pass filter 21, an Analog-to-Digital A/D Converter 23 for converting a signal outputted from the frequency transition means 22 to a digital signal, a data compressor 24 for performing a data compression of a signal converted to a digital signal from the A/D Converter 23, and a memory means 25 for temporarily storing the data compressed at the data compressor 24 to thereby output the same onto a vertical retrace line interval.

The high band signal reproducing process means 20 is controlled by the control means which comprises a synchronizing signal separator 70 for separating the video signal into a vertical and a horizontal synchronizing signal, H. Sync and V. Sync, and a system controller 80 for controlling the memory means 25 according to the horizontal and vertical synchronizing signals, H. Sync and V. Sync.

The recording means comprises a mixer 30 which utlizes an adder for adding signals outputted from the luminance/ chrominance signal separator 10 and the high band signal recording process means 20, a frequency modulator 40 for frequency-modulating the signals outputted from the mixer 30, a recording amplifier 50 for amplifying the signals frequency-modulated from the frequency modulator 40, and a head 60 for recording on the recording medium the signals amplified on the recording amplifier 50.

Figure 2:
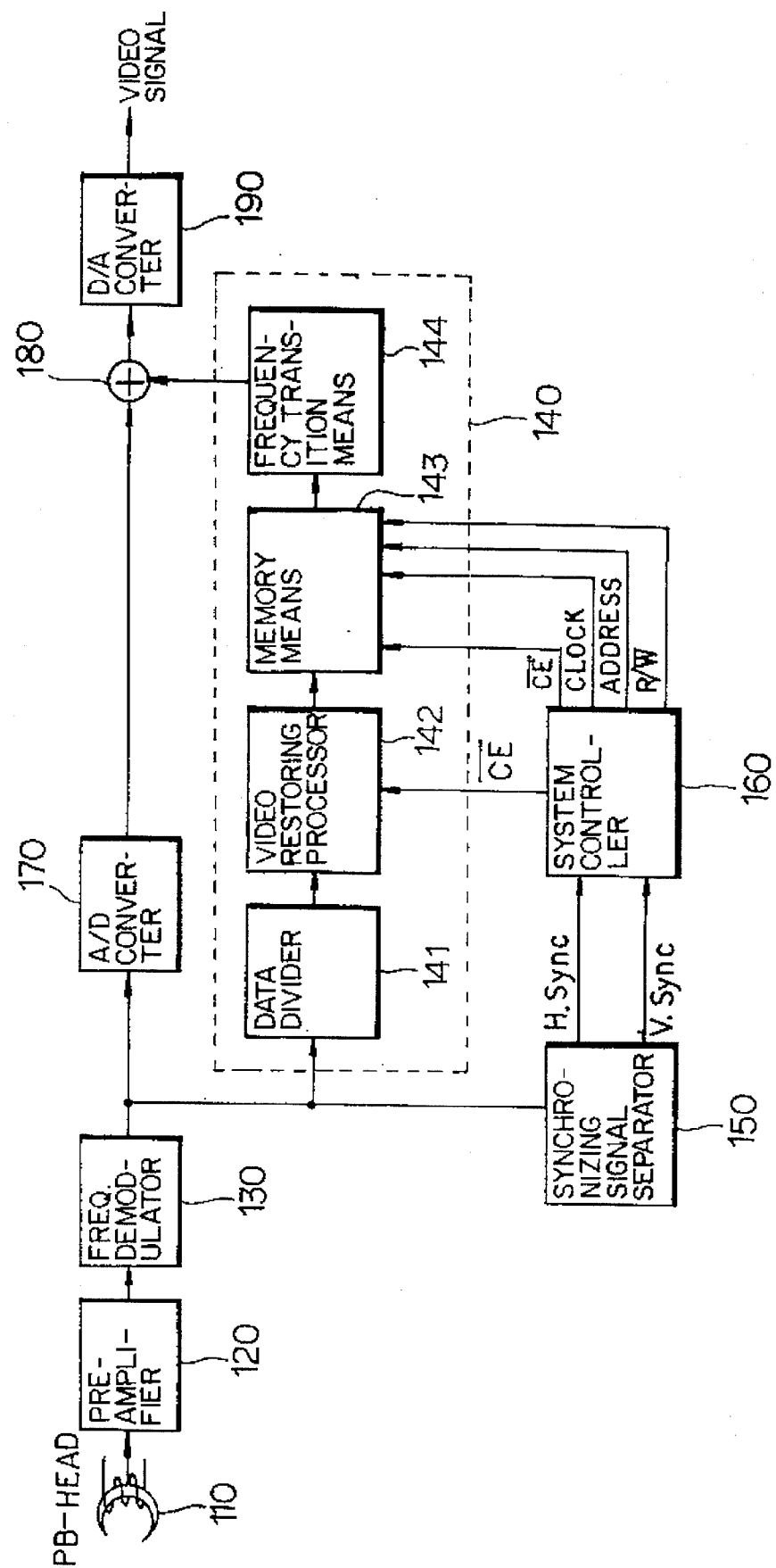
FIG. 2 is a block diagram of a video signal reproducing apparatus in accordance with the present invention.

FIG. 2 is a block diagram of a video signal reproducing apparatus in accordance with the present invention. The reproducing apparatus comprising a reproducing means for reproducing a video signal recorded on a recording medium, and a high band signal reproducing process means 140 wherein, among the signals reproduced in the reproducing means, a high band signal reproduced and compressed in a vertical retrace line interval is restored to thereby be transmitted to a high band and to be outputted.

In the apparatus thus constructed, the reproducing means comprises a head 110 for reproducing a signal recorded on a recording medium, a pre-amplifier 120 for amplifying an output signal of the head 110, and a frequency demodulator 130 for demodulating the signal amplified from the pre-amplifier 120.

The high band signal reproducing process means 140 comprises a data divider 141 for dividing signals of the high frequency band among the signals demodulated from the frequency demodulator 130, a video restoring processor 142 for restoring the compressed signals outputted from the data divider 141, a memory means 143 which temporarily stores the signals restored from the video restoring processor 142 by control of the control means to thereafter output the same to an original position, and a frequency transition means 144 for transmitting the signal outputted from the memory means 143 to an original frequency band.

The high band signal reproducing process means 140 is controlled by a control means.

The control means comprises a synchronizing signal separator 150 for separating a horizontal and a vertical synchronizing signal, H. Sync and V. Sync, from the signals demodulated from the frequency demodulator 130 of the reproducing means, and a system controller 160 for controlling the data divider 141 and the memory means 143 of the high band signal reproducing process means 140 in response to a synchronizing signal separated from the synchronizing signal separator 150.

The signal demodulated from the frequency demodulator 130 of the reproducing means is converted to a digital signal by an Analog-to-Digital A/D Converter 170.

A mixer utilizing an adder adds the signal from the A/D Converter 170 to the signal reproduced from the high band signal reproducing process means 140 to thereby output the same.

A Digital-to-Analog D/A Converter 190 converts the digitalized signal from the mixer 180 to an analog signal to thereafter output same.

Figure 3:
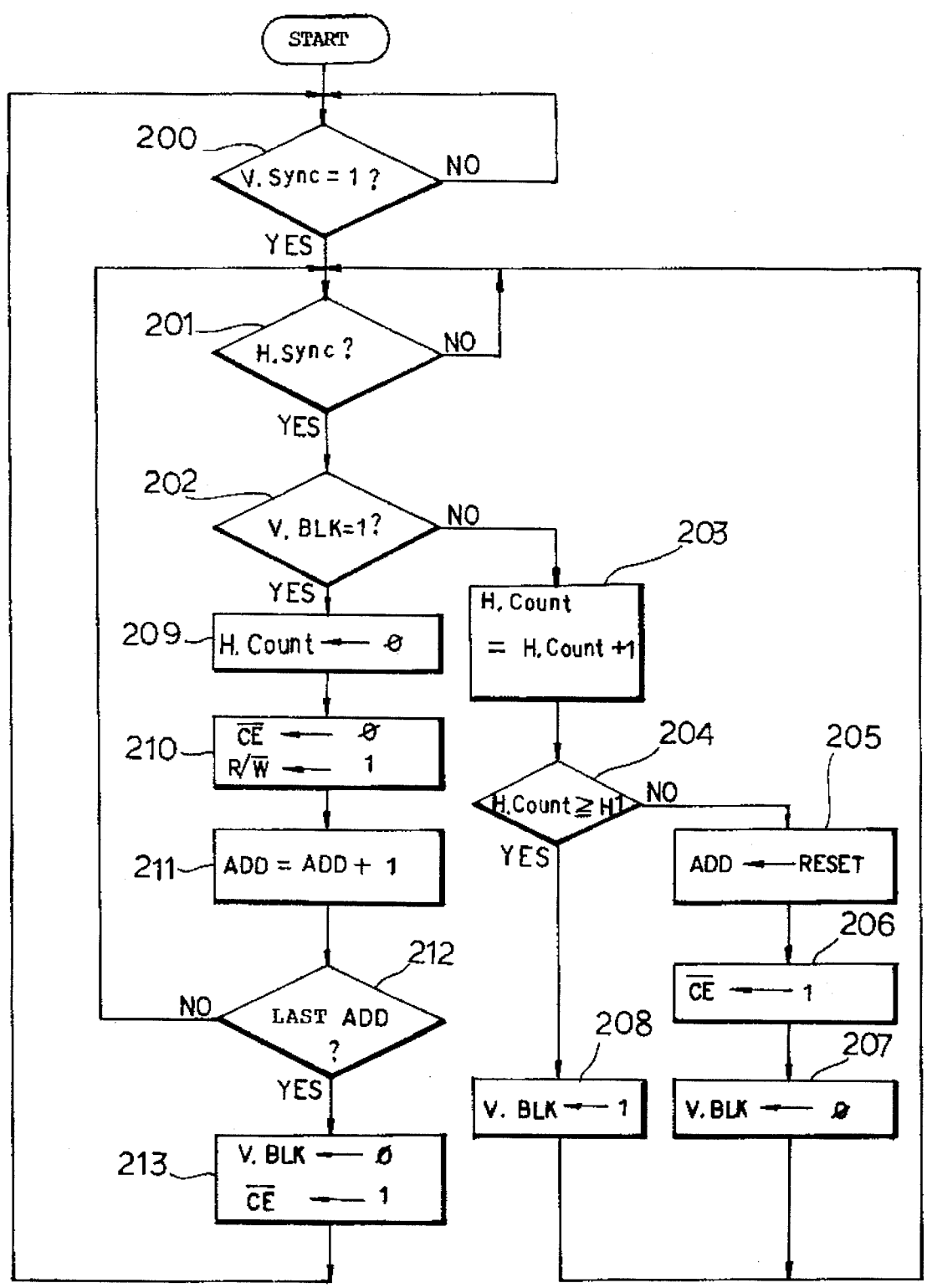
FIG. 3 is a flow chart of a process wherein a system controller of the video signal recording apparatus illustrated in FIG. 1 controls a memory means.

FIG. 3 is a flow chart of a process wherein the memory means 25 of the high band signal recording process means 20 is controlled by the system controller 80 according to the horizontal and vertical synchronizing signals, H. Sync and V. Sync outputted from the synchronizing signal separator 70 of the video signal recording apparatus as illustrated in FIG. 1.

In FIG. 3, steps 200, 201 and 202 are processes which discriminate a state of a signal inputted from the synchronizing signal separator 70.

Steps 203, 204, 205, 206, 207 and 208 are processes which process a time for reaching a record efficiency range within the vertical retrace line interval.

Steps 209, 210, 211, 212 and 213 are reading processes wherein signals from the memory means 25 of the high band signal recording process means 20 are read within the record efficiency range.

An operation of the preferred embodiment will be described with reference to the accompanying drawings.

First of all, the luminance/chrominance signal separator 10 of the video signal recording apparatus as illustrated in FIG. 1 separates a luminance signal from the incoming composite video signal.

Of course, a chrominance signal is also separated however in the description of the present invention, a chrominance signal processing will be omitted.

The high pass filter 21 of the high band signal recording process means 20 sets up 2.5 MHZ as a threshold value, and passes only signals in a frequency band that are over a predetermined frequency (2.5 MHZ in the present invention) from the luminance signals separated by the luminance/ chrominance signal separator 10.

Therefore, if a total frequency band of the luminance signals outputted from the luminance/chrominance signal separator 10 is 0–5 MHZ, the frequency band of the signals outputted from the high pass filter 21 becomes a range of 2.5–5 MHZ.

The frequency transition means 22 of the high band signal recording process means 20 is intended to convert signals of a frequency band over a predetermined frequency outputted from the high pass filter 21 to a low band range (0–2.5 MHZ in the present invention), which is a conventional frequency transition method.

The A/D Converter 23 converts the signals transmitted from the frequency transition means 22 to digital signals to thereafter output same.

The video compressing processor 24 is intended to compress the digital signals from the A/D Converter 23 in order to save the same within the vertical retrace line interval. The processor 24 operates according to a method known as Motion Picture Experts Group, MPEG, or other known methods.

The MPEG method analyses the inputted video signals statistically to thereby detect a distribution density, and the component having the thickest density will be made with a shortest code length while the component having a coarsest density will be set up with a longest code length.

The memory means 25 temporarily stores the signals outputted from the video compressing processor 24 to thereafter output the same to the vertical retrace line interval in response to the control of the control means.

Meanwhile, the synchronizing signal separator 70 of the control means separates the horizontal and vertical synchronizing signals, H. Sync and V. Sync from the composite video signals inputted to the luminance/chrominance signal separator 10.

The system controller 80 controls, so that the signals stored in the memory means 25 can be outputted to the vertical retrace line interval in response to the horizontal and vertical synchronizing signals, H. Sync and V. Sync, separated from the synchronizing signal separator 70.

Therefore, the memory means 25 is continuously established as a storage mode (or recording mode) except for the vertical retrace line interval.

Even the data quantity and data address to be stored in the memory means 25 are controlled by previously-established data in the vertical retrace line interval.

A detailed explanation will be given hereunder for the system controller 80.

The system controller 80 outputs a chip enable signal (CE), a clock signal (CLOCK), an address signal and a read/write signal to the memory means 25 in accordance with the horizontal and vertical synchronizing signals, H. Sync and V. Sync outputted from the synchronizing signal separator 70.

The read/write signal refers to a signal for controlling a read and write operation of the memory means 25.

Accordingly, a logic signal of low level is outputted from a read/write (R/W) terminal of the system controller 80 during a storing mode, and during a write mode, a logic signal of high level is outputted. During this time, the chip enable signal (CE) is always inputted to memory means 25 as a low logic state.

The mixer 30 adds the luminance signal outputted from the luminance/chrominance signal separator 10 to a signal outputted from the memory means 25 of the high band signal recording process means 20 to thereafter output same.

At this moment, the signal outputted from the memory means 25, as mentioned above, is modulated during the vertical retrace line interval.

The frequency modulator 40 modulates the signal outputted from the mixer 30, and the luminance signal outputted from the luminance/chrominance signal separator 10 changes the frequency in response to the amplitudes to thereby output a stable state of waveforms. The digital signals outputted from the memory means 25 modulates the frequency to thereafter convert the same to analog signals.

The recording amplifier 50 amplifies the signal outputted from the frequency modulator 40, and the head 60 records the signal amplified from the recording amplifier 50 on a recording medium.

Next, an operational procedure will be described in connection with FIG. 2.

In FIG. 2, the head 110 reproduces the signal recorded on the recording medium.

A pre-amplifier 120 amplifies the signal reproduced from the recording medium by the head 110.

A frequency demodulator 130 demodulates the signal amplified by the pre-amplifier 120 to thereafter output same.

A synchronizing signal separator 150 separates the horizontal and vertical synchronizing signals H. Sync and V. Sync from the signals outputted from the frequency demodulator 130 to thereafter output same to the system controller 160.

The data divider 141 of the high band signal reproducing process means 140 divides only the high frequency band signals having been recorded in the vertical retrace line interval during recording, from the signals outputted from the frequency demodulator 130. In other words, the system controller 160 detects the vertical retrace line interval which is the record efficiency range by receiving the horizontal and vertical synchronizing signals, H. Sync and V. Sync, and during the vertical retrace line interval, the low chip enable (CE) signal is outputted to the data divider 141 of the high band signal reproducing process means 140.

Accordingly, the data divider 141 detects only the high band signal from the video signals inputted from the frequency demodulator 130 to thereafter output the same.

At this moment, the data divider 141 can utilize an operational amplifier based on a black level so that only the signal of the data range is outputted.

Meanwhile, the video signal passing through the data divider 141 becomes digitalized information demodulated by the frequency demodulator 130.

A video restoring processor 142 of the high band signal reproducing process means 140 restores the digital video signal outputted from the data divider 141 to an original state by a method running counter to a compressing method realized in the video compressing processor 24 in FIG. 1.

A memory means 143 temporarily stores the signal outputted from the video restoring processor 142, and then the actual video signal is read by the system controller 160.

A frequency transition means 144 transmits the signal transmitted or converted to a low frequency band by the frequency transition means 22 in FIG. 1 to a high frequency band.

In other words, because the signal in a frequency band of 2.5–5 MHZ during the recording process is transmitted to a frequency band of 0–2.5 MHZ for recording, the signal outputted from the memory means 143 during the reproducing process stays in a frequency band of 0–2.5 MHZ, and so the frequency is restored to 2.5–5 MHZ.

The restoring method is based on a conventional frequency transition method.

An Analog-to-Digital A/D Converter 170 converts a signal outputted from the frequency demodulator 130 to a digital signal.

A mixer 180 mixes an output signal of the frequency demodulator 130 converted to a digital signal at the A/D Converter 170 with an output signal of the frequency transition means 144 to thereby output a video signal of the total bands.

A Digital-to-Analog D/A Converter 190 converts a signal outputted from the mixer 180 to thereafter output same.

FIG. 3 is a flow chart of a process wherein the system controller 80 of the video signal recording apparatus illustrated in FIG. 1 controls the memory means 25 of the high band signal recording process means 20.

In other words, FIG. 3 is a flow chart of a process wherein a high frequency band signal recorded on the memory means 25 is controlled to thereby read the same in a region where the recording is effective during the vertical retrace line interval.

First of all, the vertical retrace line interval, as is well known, corresponds to 19–21H among the signals separated from the synchronizing separator 10.

In other words, the vertical retrace line interval is added up to by a 3H equalizing pulse period, a 3H vertical synchronizing period, another 3H equalizing pulse period and a 10–12H period wherein only the horizontal synchronizing signal as a blank region exits.

In the present embodiment, the record efficiency range ranges from a data region corresponding to the horizontal synchronizing signal detected right after a whole detection of a second equalizing pulse in the vertical retrace line interval to a region where part of the horizontal synchronizing signal on which an actual video is carried is detected.

According to the pulses in the vertical retrace line interval thus constructed, the system controller 80 (FIG. 1) discriminates whether or not the vertical synchronizing signal V. Sync is inputted from the synchronizing signal separator 70, step 200.

As a result of step 200, if the vertical synchronizing signal V. Sync is not inputted, repeated checks are performed until the input is made.

If the vertical synchronizing signal, V. Sync is inputted according to a check result of the step 200, process checks are conducted concerning whether or not the horizontal synchronizing signal, H. Sync is inputted, step 201.

If the horizontal synchronizing signal, H. Sync is inputted, the process checks whether or not the present vertical retrace line interval is the record efficiency range, step 202.

Generally speaking, the vertical retrace line interval is called a vertical blanking (v. Blanking) interval.

Here, the vertical retrace line interval is marked as V. BLK, and when V. BLK equals 1, which is the aforementioned record efficiency range, and when V. BLK=0, it is defined as "not in the record efficiency range" even though within the vertical retrace line interval.

In other words, even though it is discriminated that the vertical synchronizing signal, V. Sync in the vertical retrace line interval is rendered applied and the horizontal synchronizing signal, H. Sync is inputted, unless the second equalizing pulse period is all passed, it is regarded that V. BLK equals zero and the vertical retrace line interval is not the record efficiency range.

If the vertical retrace line is not the record efficiency range at step 202, then the system controller 80 counts the inputted horizontal synchronizing signal through a predetermined count register.

At this moment, the counter upcounts by one (H. count= H.+1), step 203.

The count value at the step 203 is compared with a count reference value Hi of a pre-stored horizontal synchronizing signal, step 204.

Here, the reference value is determined according to how the aforementioned record efficiency range is established.

If the number (H. count) of the horizontal synchronizing signal counted by a comparison result at the step 203 is smaller than the count reference value H1, the system controller 80 resets the addresses, step 205, and outputs the chip enable signal (CE) in a "high" level (i e., "1") to thereby disable the memory means 25, step 206.

Furthermore V. BLK is set as zero, step 207, showing that the present vertical retrace line interval is not the record effective state, and the process returns back to the step 201, and checks if the horizontal synchronizing signal is inputted.

These kinds of processes are repeated, steps 201–208, and if the count value H. count of the horizontal synchronizing signal is larger than or equal to the count reference value H1 at the step 204, the present vertical retrace line interval is discriminated as a recording region, thereby setting V. BLK as 1, step 208.

After the step 208, the process returns back to step 201 and checks again whether or not the horizontal synchronizing signal is inputted.

If the horizontal synchronizing signal is inputted at the step 201, a check is made as to whether or not V. BLK is set as 1, step 202.

At this moment, since V. BLK is set as 1 at the step 208, the present vertical retrace line interval is discriminated as the record efficiency range and the process performs the steps 209 through 213.

The steps 209–213 are processes wherein signals are read from the memory means 25 of the high band signal record processing means 20 in the record efficiency range.

As in the step 209, the system controller 80 clears the count value of the aforementioned predetermined count register to zero.

Likewise, a "low" chip enable signal (CE) is outputted to the memory means 25 and at the same time, a "high" read/write signal (R/W) is outputted, step 210.

Accordingly, the memory means 25 is set in a write mode, addresses are incremented (ADD=ADD+1) by a clock signal CLOCK, and the stored data is thereby outputted, step 211.

When the last address is read, step 212, the system controller 80 resets V. BLK (V. BLK=0) and outputs the "high" chip enable signal (CE), step 213.

A check is made again as to whether or not the vertical synchronizing signal is detected, step 200.

At this moment, the chip enable signal (CE) is again changed to a low state of logic level in order to set the memory means 25 in a storage mode in a region where the actual compressed video is loaded.

FIG. 3 details a process where a data is read from the memory means 25 of the high band signal record processing means 20 illustrated in FIG. 1, however, it is apparent that the process where the data is stored can be executed by control of the read/write signal (R/W).

Furthermore, the process wherein a data is recorded and reproduced in the memory means 143 of the high band signal reproducing process means 140 in FIG. 2 can be executed by the aforementioned process.

In addition, in the recording apparatus as illustrated in FIG. 1 and the reproducing apparatus as shown in FIG. 2, the synchronizing signal separator, system controller, memory means, head and the like can be used in common.

It is apparent, of course, that a switching means can separately be added for switching operations in recording and reproducing.

The foregoing description and drawings are illustrative and are not to be taken as limiting. Still other variations and modifications are possible without departing from the spirit and scope of the present invention.

For example, although a case of composite video signal having a frequency band of approximately 0–5 MHZ was described in the preferred embodiment, the utilized frequency band can be varied.

As seen in the foregoing, the present invention compresses and records the high band signal included in the composite video signal to the vertical retrace line interval to thereafter reproduce the same, resulting in an improved resolution.

What is claimed is:

1. A video signal recording apparatus comprising:

high band signal recording process means for receiving a high band signal separated from an input video signal, and for converting the high band signal to a low band and for compressing the converted signal and outputting the compressed signal only during a vertical retrace line interval; and recording means for recording, on a recording medium, a combination of the input video signal and a resultant video signal from the high band signal recording process means, the combination having the resultant video signal exist only in the vertical retrace line intervals of the input video signal.

2. A video signal recording apparatus as defined in claim 1, wherein the high band signal recording process means comprises:

a high pass filter for passing only a high frequency band signal among luminance signals separated by a luminance/chrominance signal separator;

frequency transition means for converting a signal outputted from the high pass filter to a low band signal;

an Analog-to-Digital converter for converting a signal outputted from the frequency transition means to a digital signal;

a data compressor for performing a data compression of the signal converted to a digital signal by the Analog-to-Digital converter; and memory means for temporarily storing the data compressed by the data compressor to thereby output the same during the a vertical retrace line interval.

3. A video signal recording apparatus as defined in claim 1, wherein the high band signal is a luminance signal.

4. A video signal recording apparatus as defined in claim 1, further comprising a control means, and wherein the high band signal recording process means is controlled by said control means.

5. A video signal recording apparatus as defined in claim 4, wherein the control means comprises:

a synchronizing signal separator for separating a synchronizing signal from the video signal; and a system controller for controlling a memory according to the synchronizing signal separated from the synchronizing signal separator.

6. A video signal recording apparatus as defined in claim 1, further comprising a luminance/chrominance signal separator for receiving a composite video signal and wherein the recording means comprises:

a mixer for adding signals outputted from said luminance/chrominance signal separator and the high band signal recording process means; and a frequency modulator for frequency-modulating the signals outputted from the mixer.

7. An apparatus as defined in claim 6, wherein the recording means further comprises a recording amplifier for amplifying the signals frequency-modulated from the frequency modulator; and a head for recording, on the recording medium, the signals amplified by the recording amplifier.

8. A video signal reproducing apparatus, comprising:

reproducing means for reproducing video signals recorded on a recording medium; and a high band signal reproducing process means wherein, among signals reproduced by the reproducing means, a signal previously compressed and recorded only during a vertical retrace line interval is restored to thereby be converted to a high band signal and to be outputted.

9. A video signal reproducing apparatus as defined in claim 8, wherein the reproducing means comprises:

a head for reproducing a signal recorded on the recording medium;

a pre-amplifier for amplifying an output signal of the head; and a frequency demodulator for demodulating the signal amplified from the pre-amplifier.

10. A video signal reproducing apparatus as defined in claim 8, wherein the high band signal is a luminance signal.

11. A video signal reproducing apparatus as defined in claim 8, wherein the high band signal reproducing process means comprises:

a data divider for dividing signals of a high frequency band among demodulated signals;

a video restoring processor for restoring the divided signals outputted from the data divider;

memory means which temporarily stores the signals restored from the video restoring processor to thereafter output the stored signals to an original position; and frequency transition means for converted the signals outputted from the memory means to an original frequency band.

12. A video signal reproducing apparatus as defined in claim 11, further comprising a control means, and wherein the high band signal reproducing process means is controlled by the control means.

13. A video signal reproducing apparatus as defined in claim 12, wherein the control means comprises:

a synchronizing signal separator for separating a horizontal and a vertical synchronizing signal, from signals demodulated from a frequency demodulator of the reproducing means; and a system controller for controlling the data divider and the memory means of the high band signal reproducing process means in response to a synchronizing signal separated from the synchronizing signal separator.

14. A video signal reproducing apparatus as claimed in claim 8, further comprising a mixer for adding the video signal reproduced from the reproducing means to the signal processed from the high band signal reproduced process means, to thereafter output a mixed signal.

15. A video signal recording method for a video signal recording apparatus including a high band signal processor equipped with a memory receiving a high band signal representing a selected component of a composite video signal and a modulator receiving the selected component signal and an output from the signal processor during, respectively, a first period of time and a vertical retrace line interval, said method comprising the steps of:

(a) storing digital data representing a low band converted from a high band of said selected component in said memory so as to permit read out as output digital data;

(b) modulating a carrier wave responsive to said selected component applied to said modulator during said first period of time; and (c) modulating said carrier wave responsive to said output digital data applied to said modulator during said vertical retrace line interval.

16. The method recited in claim 15, wherein said step (a) further comprises the steps of:

(d) converting said high band signal to said low band signal so as to produce a converted high band signal;

(e) digitizing said converted high band signal to produce digitized data;

(f) compressing said digitized data to thereby produce said digital data; and (g) storing said digital data.

17. The method recited in claims 16, wherein said step (f) comprises the step of Motion Picture Experts Group (MPEG) compressing said digitized data to thereby produce said digital data.

18. A method for generating a selected component of a composite video signal including a high band and a low band signal stored on a recording medium as a first analog signal representing said high band, said first analog signal being stored in a vertical retrace line interval of a video field, and a second analog signal represent said low band signal, said second analog signal being stored in a physically separated second portion of said video field, wherein said first and said second analog signals are recorded in a low band frequency range, said method comprising the steps of:

(a) generating digital high band data representing said first analog signal;

(b) digitizing said second analog signal so as to produce digital low band data; and (c) adding said digital high band data to said digital low band data so as to produce a digital selected component.

* * * * *